US010628000B2

(12) United States Patent
Taniguchi

(10) Patent No.: US 10,628,000 B2
(45) Date of Patent: Apr. 21, 2020

(54) ELECTRONIC BOOK BROWSING ASSISTANCE METHOD AND BROWSING ASSISTANCE PROGRAM

(71) Applicant: MISUMI GROUP INC., Tokyo (JP)

(72) Inventor: Koichi Taniguchi, Tokyo (JP)

(73) Assignee: Misumi Group Inc., Tokyo (JP)

( * ) Notice: Subject to any disclaimer, the term of this patent is extended or adjusted under 35 U.S.C. 154(b) by 45 days.

(21) Appl. No.: 15/778,424

(22) PCT Filed: Nov. 25, 2015

(86) PCT No.: PCT/JP2015/083055
§ 371 (c)(1),
(2) Date: May 23, 2018

(87) PCT Pub. No.: WO2017/090120
PCT Pub. Date: Jun. 1, 2017

(65) Prior Publication Data
US 2018/0348975 A1    Dec. 6, 2018

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 1/1694* (2013.01); *G06F 3/0346* (2013.01);
(Continued)

(58) Field of Classification Search
CPC ...................................................... G06F 3/048
See application file for complete search history.

(56) References Cited

U.S. PATENT DOCUMENTS

| 8,352,876 B2 | 1/2013 | Batarseh et al. |
| 2003/0052900 A1 | 3/2003 | Card et al. |

(Continued)

FOREIGN PATENT DOCUMENTS

| EP | 2 587 357 A2 | 5/2013 |
| JP | 2006-053605 A | 2/2006 |

(Continued)

OTHER PUBLICATIONS

Extended European search report dated Apr. 4, 2019 issued in the corresponding EP Patent Application No. 15909239.4.

*Primary Examiner* — Pei Yong Weng
(74) *Attorney, Agent, or Firm* — Carrier Blackman & Associates, P.C.; Joseph P. Carrier; Jeffrey T. Gedeon

(57) ABSTRACT

A fore edge image display unit (11) displays fore edge image (60) depicting a fore edge when a tilt sensor (22) detects tilt operation of a touch panel display unit (20) when a contact position detection circuit (21) detects an indicator contacting right or left edge part of the touch panel display unit (20). An edge index display unit (12) displays edge indices (61*a*) to (61*s*) in vertically shifted and superposed manner on the fore edge image (60). An item name image display unit (13) performs enlarged display of item name image, representing the name of item assigned to an edge index in contact. When tilt operation of the touch panel display unit (20) is detected when the contact position detection circuit (21) detects the indicator contacting one of the edge indices, selected page display unit (14) displays the page of the item assigned to the edge index in contact.

6 Claims, 10 Drawing Sheets

(51) Int. Cl.
    *G06F 3/0488*     (2013.01)
    *G06F 3/0346*     (2013.01)
    *G06F 1/16*     (2006.01)

(52) U.S. Cl.
    CPC ........ *G06F 3/0488* (2013.01); *G06F 3/04886* (2013.01); *G06F 2200/1614* (2013.01); *G06F 2200/1637* (2013.01)

(56) References Cited

U.S. PATENT DOCUMENTS

| | | | |
|---|---|---|---|
| 2012/0124505 A1 | 5/2012 | St. Jacques, Jr. | |
| 2012/0133677 A1 | 5/2012 | Suzuki et al. | |
| 2013/0002585 A1* | 1/2013 | Jee | G06F 3/0488 345/173 |
| 2013/0106809 A1* | 5/2013 | Ohsaki | G06F 1/1694 345/204 |
| 2013/0159913 A1* | 6/2013 | Cha | G06F 3/0483 715/776 |
| 2013/0293470 A1 | 11/2013 | Kwon | |

FOREIGN PATENT DOCUMENTS

| | | |
|---|---|---|
| JP | 2006-323859 A | 11/2006 |
| JP | 2010-237928 A | 10/2010 |
| JP | 2012-113600 A | 6/2012 |
| JP | 2013-235568 A | 11/2013 |

\* cited by examiner

FIG.5
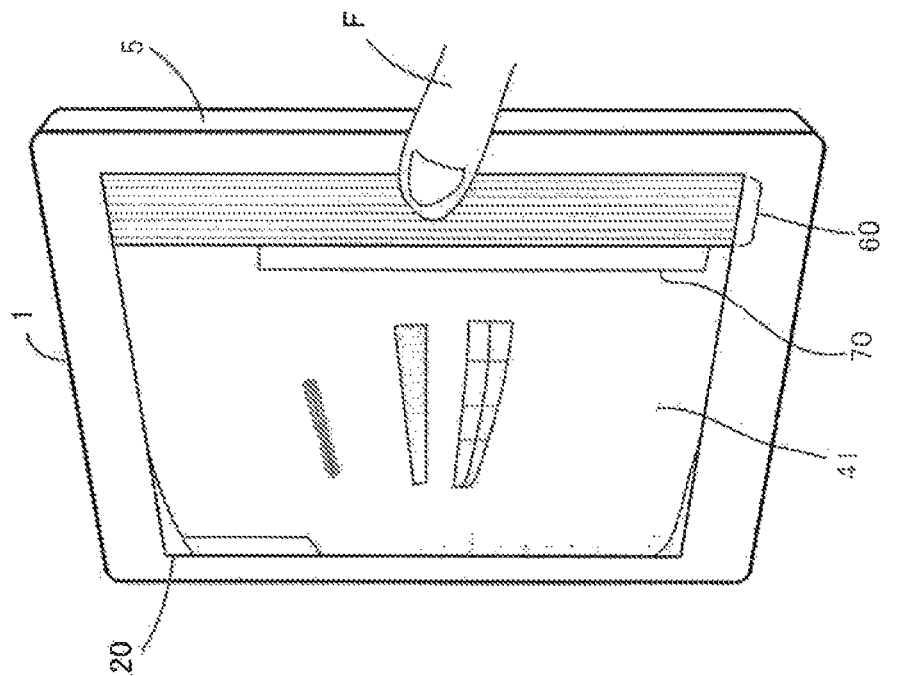
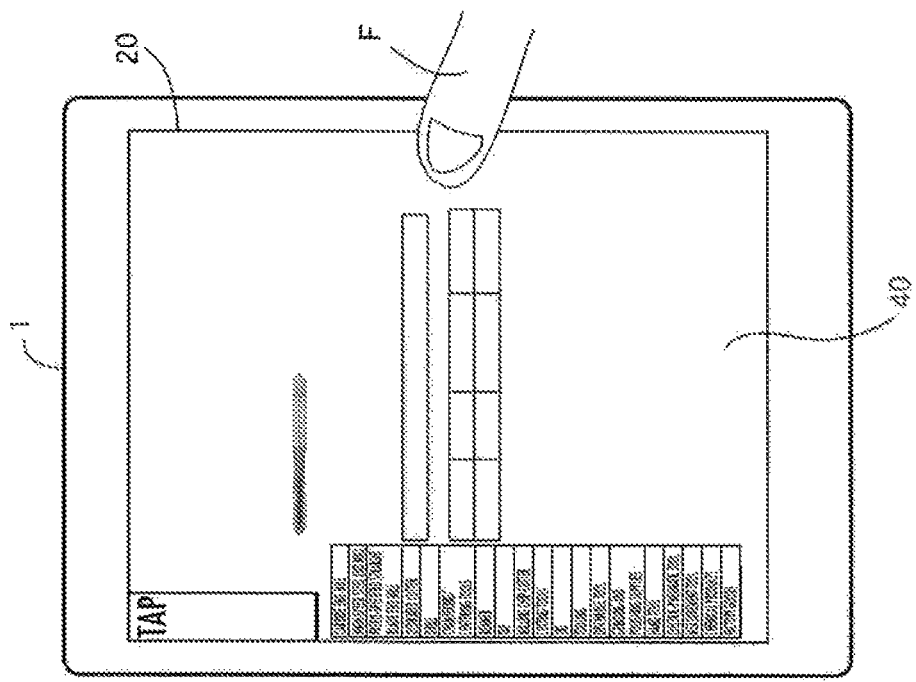

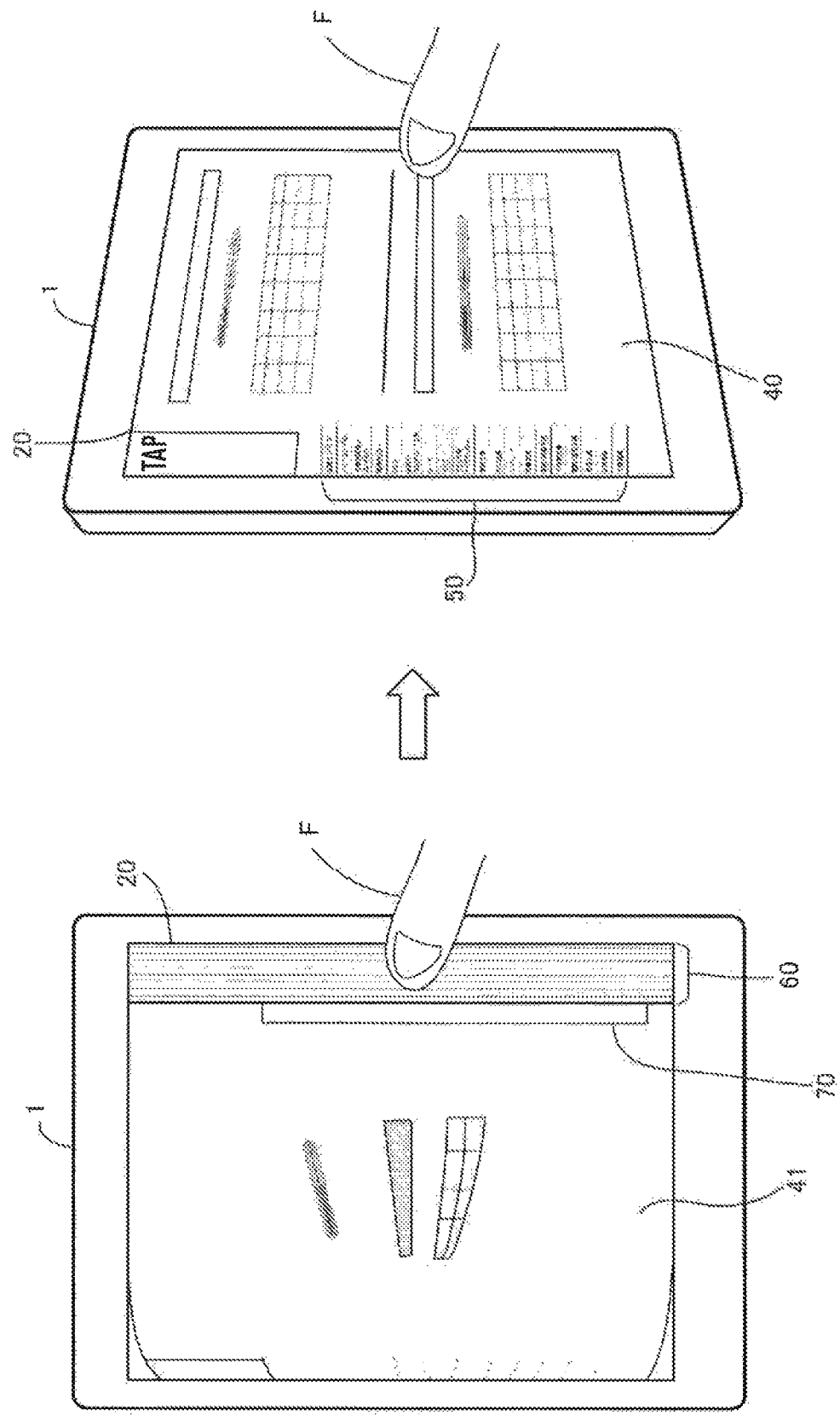

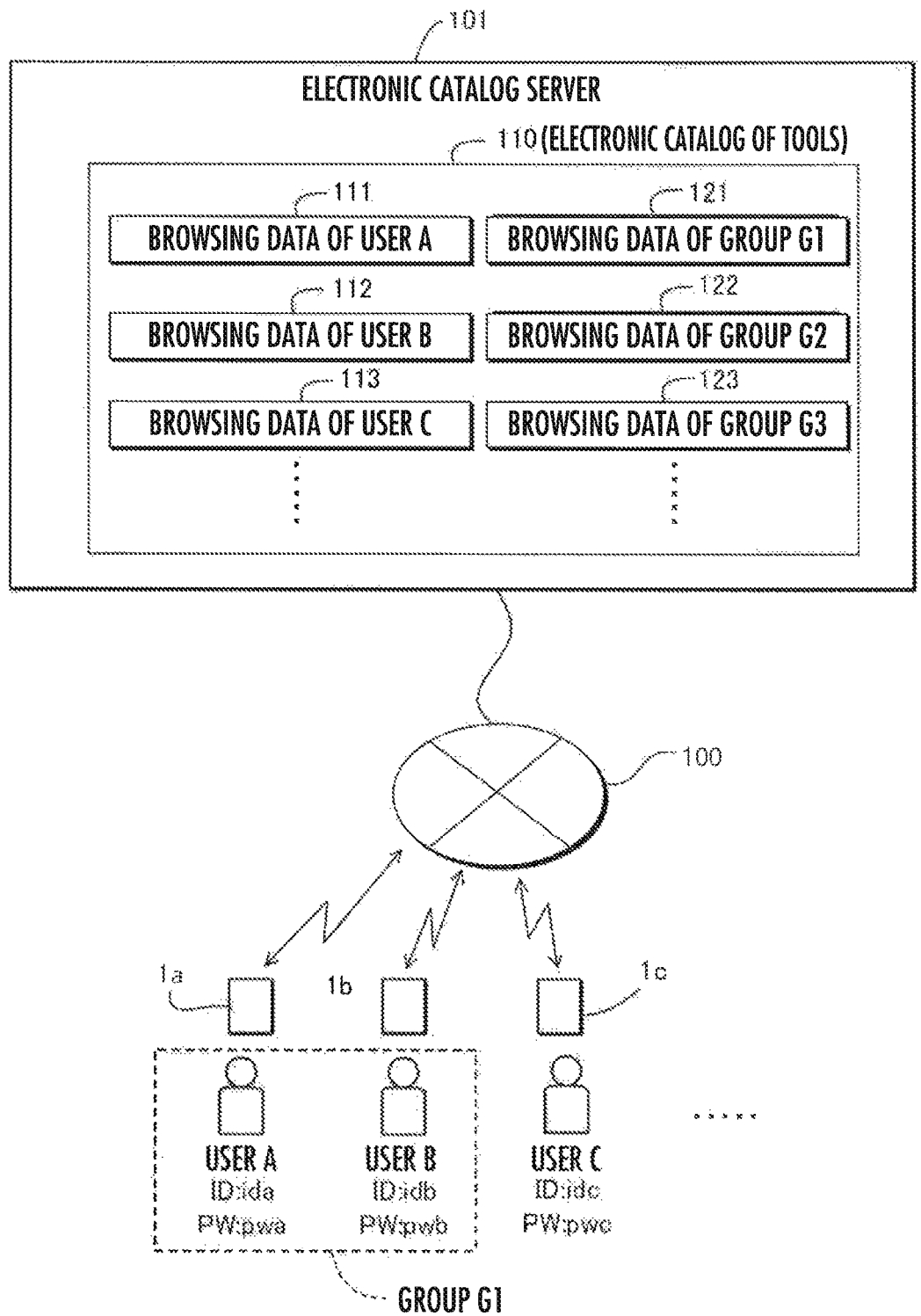

ELECTRONIC BOOK BROWSING ASSISTANCE METHOD AND BROWSING ASSISTANCE PROGRAM

TECHNICAL FIELD

The present invention relates to a method for assisting in browsing an electronic book by using a touch panel display device and a program therefor.

BACKGROUND ART

Conventionally, there have been suggested various methods for facilitating browsing of an electronic book by using a touch panel device (a device having a touch panel display unit, such as a tablet terminal, a smartphone, a personal computer, or the like) (for example, refer to Patent Document 1).

Patent Document 1 describes that, in the case where a visitor continuously touches a certain place of a touch panel display unit for a predetermined time or longer, an enlargement target region around the touched place is set and an image obtained by enlarging the enlargement target region is superposed on the original image and displayed. The image is displayed in this manner, thereby enabling the visitor to visually recognize the original image and an enlarged image of a part of the original image simultaneously and thus enabling an increase in the browsing performance of information displayed in the touch panel display unit.

CITATION LIST

Patent Literature

Patent Document 1: Japanese Patent Application Laid-Open No. 2010-237928

SUMMARY OF INVENTION

Technical Problem

When browsing an electronic book such as a catalog or the like with a touch panel device, it is desirable that a visitor is able to perform a quick search for a part where target information is described while turning pages in the same manner as in the case of browsing a paper-based book.

The present invention has been provided in view of the above background. Therefore, it is an object of the present invention to provide an electronic book browsing assistance method and an electronic book browsing assistance program enabling a quick search for a part where target information is described.

Solution to Problem

According to the present invention, there is provided a method for assisting browsing of an electronic book by using a touch panel device, the touch panel device including a touch panel display unit, a contact position detection unit configured to detect a contact position of an indicator to the touch panel display unit, a tilt detection unit configured to detect a tilt of the touch panel display unit, and a control unit configured to change the display of the touch panel display unit according to the contact position of the indicator detected by the contact position detection unit and the tilt of the touch panel display unit detected by the tilt detection unit, the method including: a fore edge image displaying step in which the control unit displays a fore edge image, which depicts a fore edge of a paper-based book and extends in a vertical direction of the touch panel display unit, in a right or left edge portion of the touch panel display unit with which the indicator is in contact when recognizing that an operation of tilting the touch panel device has been performed based on a detection situation of the tilt detection unit in a state where any one of pages of the electronic book is displayed in the touch panel display unit and where the contact position detection unit detects that the indicator is in contact with a right or left edge part of the touch panel display unit; an edge index displaying step in which the control unit displays a plurality of edge indices, which are individually assigned to a plurality of items of the electronic book and each of which indicates a range of pages of each item, so as to be shifted in the vertical direction of the touch panel display unit and in a superposed manner on the fore edge image; an item name image displaying step in which the control unit displays an item name image, which represents a name of the item assigned to the edge index with which the indicator is in contact among the plurality of edge indices, in the touch panel display unit; and a selected page displaying step in which the control unit selects and displays the page of the item, which is assigned to the edge index with which the indicator is in contact, in the touch panel display unit when recognizing that the operation of tilting the touch panel device has been performed based on a detection situation of the tilt detection unit in a state where the fore edge image is displayed in the touch panel display unit and where the contact position detection unit detects that the indicator is in contact with any one of the edge indices.

According to the electronic book browsing assistance method of the present invention, if a user (viewer) who is browsing an electronic book with the touch panel device performs a tilt operation of the touch panel device by pressing a right or left edge part of the touch panel display unit, the control unit performs the fore edge image displaying step, by which a vertically extending fore edge image is displayed in a place of the touch panel display unit with which a user's finger is in contact (a right or left edge portion of the touch panel display unit).

Moreover, the control unit performs the edge index displaying step, thereby displaying a plurality of edge indices, which are individually assigned to a plurality of items of the electronic book and each of which indicates a range of pages of each item, in a vertically shifted and superposed manner on the fore edge image. Thereafter, if the user touches any one of the edge indices due to the execution of the item name image displaying step, an item name image indicating the name of the item assigned to the edge index is displayed.

Therefore, the user is able to search for a page of the electronic book as if the user were searching for targeted information while viewing indices indicating item ranges (alphabetical strip-shaped indices including A, B, C, and the like in the case of a dictionary) provided at the fore edge of a paper-based thick book (a dictionary, a catalog, or the like). Specifically, the user is able to easily identify the range of pages of an item supposed to include targeted information by confirming the item name displayed in the item name image by sequentially touching any edge indices vertically displayed in the fore edge image.

If the user then performs an operation of tilting the touch panel device while touching any one of edge indices by performing the selected page displaying step, the page of the item assigned to the edge index is displayed in the touch panel display unit. Therefore, the user is able to view the description of the page of the electronic book corresponding to a part of the edge index touched by a finger, similarly to a case of viewing the page by opening a paper-based thick book while pressing the selected part of the fore edge of the book by a finger with the user facing the fore edge of the book.

As described above, according to the electronic book browsing assistance method of the present invention, a user is able to search for a page describing targeted information, when browsing an electronic book with a touch panel device, by the same operation as in the case of searching a thick book for a page describing targeted information with help from edge indices, thereby facilitating a user's browsing of the electronic book.

Subsequently, according to the present invention, there is provided an electronic book browsing assistance program performed by a control unit, in a touch panel device including a touch panel display unit, a contact position detection unit configured to detect a contact position of an indicator to the touch panel display unit, a tilt detection unit configured to detect a tilt of the touch panel display unit, and the control unit configured to change the display of the touch panel display unit according to the contact position of the indicator detected by the contact position detection unit and the tilt of the touch panel display unit detected by the tilt detection unit, the program causing the control unit to function as: a fore edge image display unit which displays a fore edge image, which depicts a fore edge of a paper-based book and extends in a vertical direction of the touch panel display unit, in a right or left edge portion of the touch panel display unit with which the indicator is in contact when recognizing that an operation of tilting the touch panel display unit has been performed based on a detection situation of the tilt detection unit in a state where any one of pages of the electronic book is displayed in the touch panel display unit and where the contact position detection unit detects that the indicator is in contact with a right or left edge part of the touch panel display unit; an edge index display unit which displays a plurality of edge indices, which are individually assigned to a plurality of items of the electronic book and each of which indicates a range of pages of each item, so as to be shifted in the vertical direction of the touch panel display unit and in a superposed manner on the fore edge image; an item name image display unit which displays an item name image, which represents a name of the item assigned to the edge index with which the indicator is in contact among the plurality of edge indices, in the touch panel display unit; and a selected page display unit which selects and displays the page of the item, which is assigned to the edge index with which the indicator is in contact, in the touch panel display unit when recognizing that the operation of tilting the touch panel device has been performed based on a detection situation of the tilt detection unit in a state where the fore edge image is displayed in the touch panel display unit and where the contact position detection unit detects that the indicator is in contact with any one of the edge indices.

According to the electronic book browsing assistance program of the present invention, if a user (viewer) who is browsing an electronic book with the touch panel device performs a tilt operation of the touch panel device by pressing a right or left edge part of the touch panel display unit, the fore edge image display unit displays a vertically extending fore edge image in a place of the touch panel display unit with which a user's finger is in contact.

Moreover, the edge index display unit displays a plurality of edge indices, which are individually assigned to a plurality of items of the electronic book and each of which indicates a range of pages of each item, in a vertically shifted and superposed manner on the fore edge image. Thereafter, if the user touches any one of the edge indices, the item name image display unit displays an item name image indicating the name of the item assigned to the edge index concerned.

Therefore, the user is able to easily browse the electronic book by performing the same operation as in the case of finding a page on which targeted information is described while viewing edge indices indicating item ranges (alphabetical strip-shaped indices including A, B, C, and the like in the case of a dictionary) provided at the fore edge of a paper-based thick book (a dictionary, a catalog, or the like). Specifically, the user is able to easily identify the range of pages of an item of the electronic book supposed to include targeted information by confirming the item name displayed in the item name image by sequentially touching any edge indices vertically displayed in the fore edge image.

If the user then performs an operation of tilting the touch panel device while touching any one of edge indices, the selected page display unit displays the page of the item assigned to the edge index in the touch panel display unit. Therefore, the user is able to view the content of the page of the electronic book corresponding to a part of the edge index touched by a finger, similarly to a case of viewing the page by opening a paper-based thick book while pressing the selected part of the fore edge of the book by a finger with the user facing the fore edge of the book.

As described above, according to the electronic book browsing assistance program of the present invention, a user is able to search for a page describing targeted information, when browsing an electronic book with a touch panel device, by the same operation as in the case of searching a thick book for the page describing targeted information with help from edge indices, thereby facilitating a user's browsing of the electronic book.

In the electronic book browsing assistance program of the present invention, the item name image display unit displays an item bar with a pointer, which extends in a horizontal direction of the touch panel display unit and has a horizontal width indicating a selection range of pages, as the item name image and changes the position of the pointer in the item bar according to a slide of the indicator in the horizontal direction of the touch panel display unit when the contact position detection unit detects the slide; and the selected page display unit selects a page whose arrangement order corresponds to the position of the pointer in the item bar among the pages belonging to the item assigned to the edge index with which the indicator is in contact when selecting the page of the assigned item and displays the page in the touch panel display unit.

According to the configuration, the item name image display unit displays an item bar with a pointer, which extends in the horizontal direction of the touch panel display unit and has a horizontal width indicating a selection range of pages, as the item name image. Furthermore, when the user slides his/her finger touching the touch panel display unit sideways, the item name image display unit changes the position of the pointer in the item bar in response to the slide.

Furthermore, the selected page display unit selects a page whose arrangement order corresponds to the position of the pointer in the item bar among the pages belonging to the item assigned to the edge index with which the indicator is in contact when selecting the page of the assigned item and displays the page in the touch panel display unit. Therefore, the user is able to easily recognize the position of the page under selection in the range of the pages of each item by visually recognizing the position of the pointer in the item bar.

Moreover, the electronic book browsing assistance program of the present invention includes a browsing history management unit configured to retain browsing data indicating a browsing history of a page of the electronic book browsed by a user in a browsing history storage unit, wherein the item name image display unit displays vertical lines whose display mode is changed according to a browsing frequency of each page in a place corresponding to the arrangement order of each page of the item bar with reference to the browsing history data.

According to the configuration, the user is able to easily find a frequently-browsed page (frequently-referenced page) by visually recognizing the display mode of the vertical lines corresponding to respective pages displayed in the item bar. Note here that the term "change the display mode of the vertical lines" means changing the color, the shade of color, the luminance, or the like of the vertical lines.

Moreover, the electronic book browsing assistance program of the present invention includes an identifier reception unit configured to receive input of identifiers individually assigned to a plurality of users in browsing the electronic book, wherein the browsing history management unit retains the browsing history of the electronic book for each of the identifiers and wherein the fore edge image display unit determines whether or not the browsing frequency is equal to or greater than a predetermined number of times by switching between an individual browsing mode in which the determination is performed based on the browsing frequency for each identifier and a group browsing mode in which the determination is performed based on a total browsing frequency of a plurality of identifiers according to a predetermined selection operation.

According to the configuration, in addition to the case of individually browsing (using) the electronic book, a frequently-browsed page is able to be easily found also in the case where a plurality of designers share a catalog of parts or materials.

Moreover, the electronic book browsing assistance program of the present invention includes a browsing history management unit configured to retain browsing data indicating a browsing history of a page of the electronic book browsed by a user in a browsing history storage unit, wherein the fore edge image display unit displays the fore edge image in a display mode changed according to the browsing frequency of each page with reference to the browsing data when displaying the fore edge image.

According to the configuration, the user is able to easily find a frequently-browsed page (frequently-referenced page) by visually recognizing the display mode of each page in the edge image. Note here that the term "change the display mode of the page" means changing the color, the shade of color, the luminance, or the like of the page.

BRIEF DESCRIPTION OF DRAWINGS

FIG. 5 is an explanatory diagram of an operation of displaying a search screen.

FIG. 9 is an explanatory diagram of an operation of switching the search screen, which is displayed, to a browse screen by tilting the touch panel device.

FIG. 10 is an explanatory diagram of a mode of retaining browsing data.

DESCRIPTION OF EMBODIMENTS

An example of an embodiment of the present invention will be described with reference to FIGS. 1 to 10.

Figure 1:
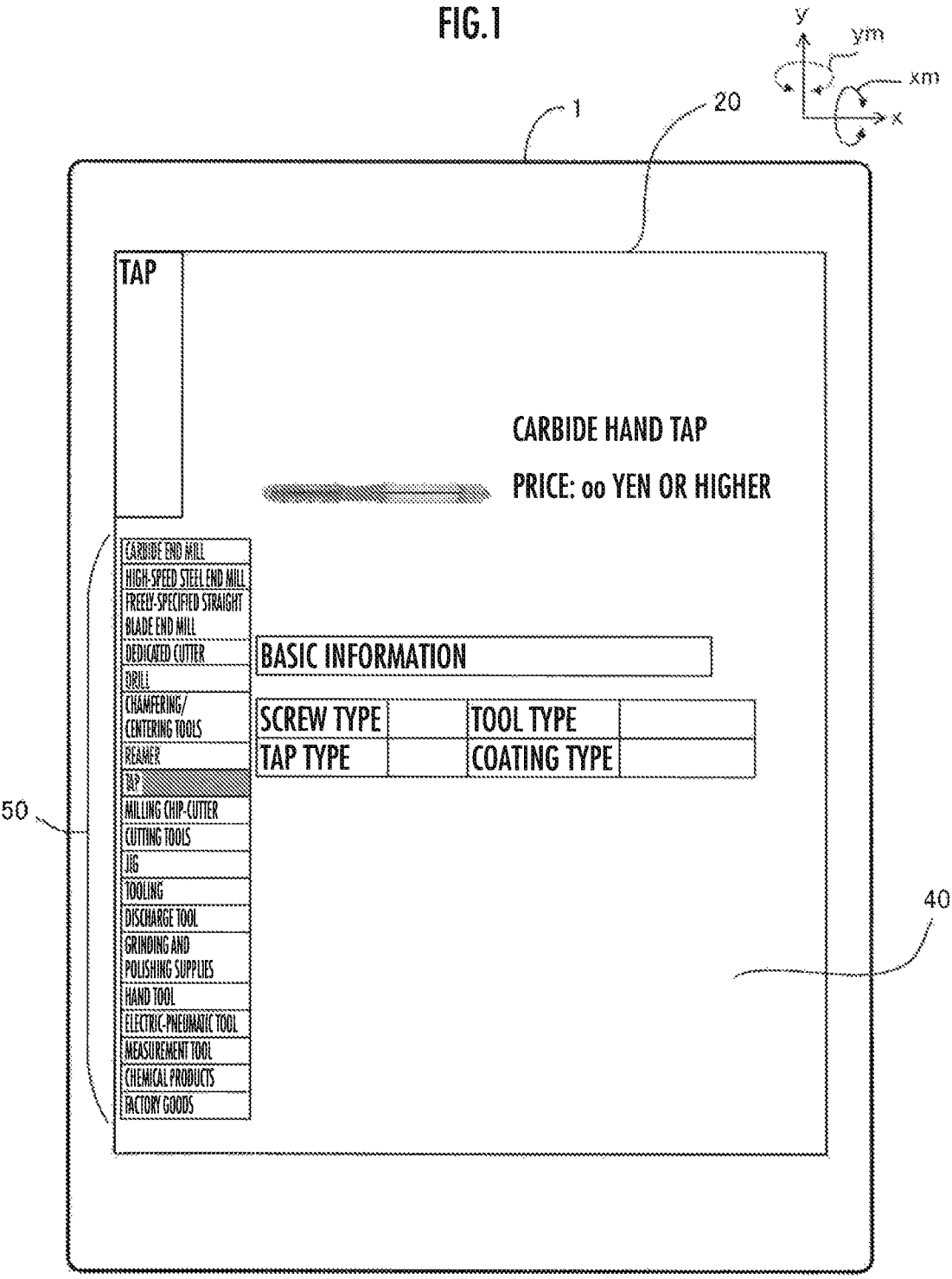
FIG. 1 is an appearance explanatory diagram of a touch panel device in which an electronic book browsing assistance method and an electronic book browsing assistance program according to the present invention are performed.

Referring to FIG. 1, a touch panel device 1 in which an electronic book browsing assistance method and an electronic book browsing assistance program of the present invention are performed is a portable tablet terminal and has a touch panel display unit 20 disposed on the front surface of the housing and a control unit 10 (see FIG. 2) which is disposed in the housing to control the display of the touch panel display unit 20. The touch panel display unit 20 is formed by piling a transparent touch panel on the surface of a liquid crystal display, for example.

FIG. 1 illustrates a state in which a browse screen 40 of an electronic catalog (corresponding to the electronic book of the present invention) of tools is displayed, with an index 50 of the tools displayed at the left edge of the touch panel display unit 20.

In this embodiment, x represents the lateral direction (the horizontal direction) of the touch panel display unit 20 and y represents the perpendicular (the vertical direction) of the touch panel display unit 20. In addition, ym represents a rotation about the y axis and xm represents a rotation about the x axis.

An index 50 is formed by arranging a plurality of item buttons individually assigned to items (categories) in the electronic catalog of the tools in the vertical direction (the y direction in FIG. 1). In the index 50, there are arranged 19 item buttons to which the following items are individually assigned, beginning at the top, such as "carbide end mill," "high-speed steel end mill," "freely-specified straight blade end mill," "dedicated cutter," "drill," "chamfering/centering tools," "reamer," "tap," "milling chip-cutter," "cutting tools," "jig," "tooling," "discharge tool," "grinding and polishing supplies," "hand tool," "electric-pneumatic tool," "measurement tool," "chemical products," and "factory goods." In FIG. 1, the item "tap" is selected and therefore the item button of "tap" is highlighted.

Figure 2:
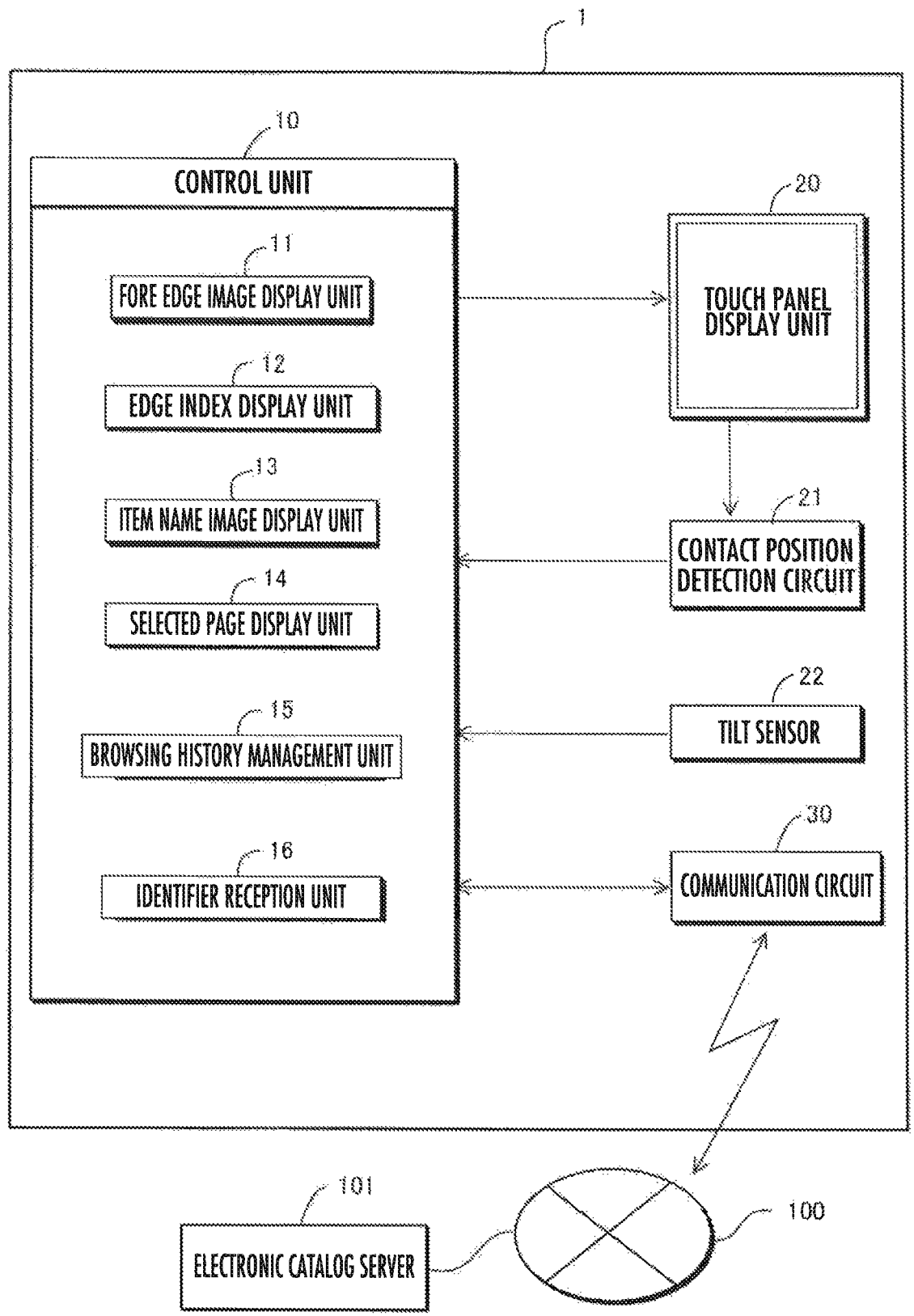
FIG. 2 is a block diagram of the touch panel device illustrated in FIG. 1.

Subsequently, referring to FIG. 2, the touch panel device 1 includes a control unit 10 and a touch panel display unit 20 and further includes a contact position detection circuit 21 (corresponding to a contact position detection unit of the present invention) which detects the position of an indicator (a user's finger, a touch pen, or the like) that contacted the touch panel display unit 20, a tilt sensor 22 (corresponding to a tilt detection unit of the present invention) which detects a tilt operation of the touch panel device 1 (a tilt operation of the touch panel display unit 20), and a communication circuit 30.

The tilt sensor 22 detects the tilt operation of the touch panel device 1 performed by a user by detecting an acceleration in the xm direction about the x axis and an acceleration in the ym direction about the y axis illustrated in FIG. 1.

The control unit 10 is an electronic circuit unit composed of a CPU, a memory, an interface circuit, and the like, which are not illustrated, implements a browsing function of an electronic book by performing an electronic book browsing assistance program retained in the memory with the CPU, and functions as a fore edge image display unit 11, an edge index display unit 12, an item name image display unit 13, a selected page display unit 14, a browsing history management unit 15, and an identifier reception unit 16, which are described later.

The control unit 10 performs electronic book browsing processing in response to a touch operation on the touch panel display unit 20 performed by a user. In this case, data of the electronic book may be previously retained in the memory of the control unit or may be downloaded from an electronic catalog server 101 via a communication network 100 by using the communication circuit 30.

When the user performs the start operation of an electronic book browsing application, the control unit 10 performs a program of the application (including the electronic book browsing assistance program of the present invention) with the CPU to display the electronic book browse screen 40 on the touch panel display unit 20 as illustrated in FIG. 1. The program of the electronic book browsing application may be previously retained in the memory of the control unit 10 or may be downloaded from the electronic catalog server 101 or the like.

On the browse screen illustrated in FIG. 1, the user (viewer) of the touch panel device 1 is able to perform page feed and page return by performing an operation of sliding a finger touching the touch panel display unit 20 sideways (swipe operation) in the same manner as in a general electronic book browsing application.

Subsequently, the control unit 10 repeats electronic book browsing assistance processing according to the flowchart of FIG. 3 to FIG. 4 in order to facilitate the search for target information performed by the user.

STEP 1 and STEP 2 are processes performed by the fore edge image display unit 11 (corresponding to a fore edge image displaying step in the electronic book browsing assistance method of the present invention). In STEP 1, the fore edge image display unit 11 determines whether or not a condition (a fore edge display condition) that an operation of tilting the touch panel device 1 to the left has been performed (tilting to the left at a separately-set angle or more has occurred) in a state where it is detected that an indicator (a user's finger in this embodiment) is in contact with the right edge part of the touch panel display unit 20 is satisfied, as illustrated in FIG. 5, on the basis of the detection situations of the contact position detection circuit 21 and the tilt sensor 22.

Note here that it is required that the touch panel device 1 is tilted to the left in STEP 1 since the electronic book of this embodiment is set to opening to left, though it is required that the touch panel device 1 is tilted to the right when the electronic book of this embodiment is set to opening to right.

The left side of an arrow in FIG. 5 illustrates a state in which the browse screen 40 is displayed in the touch panel display unit 20 of the touch panel device 1 and the right side of the arrow illustrates a state of the touch panel display unit 20 displaying the search screen 41 on which a fore edge image 60 and an item name image 70 are displayed by a user's operation of tilting the touch panel device 1 to the left.

The operation of STEP 1 is intended to turn the right side face 5 of the touch panel device 1 toward the user as illustrated on the right side of FIG. 5. Since the electronic book of this embodiment is set to opening to left, this operation is the same operation as in the case of searching pages for an edge index (a strip-shaped colored portion indicating a range of pages for each item) provided at the fore edge of the book set to opening to left.

Note that the control unit 10 maintains the state of displaying the search screen 41 illustrated on the right side of FIG. 5 even after the user returns the tilting of the touch panel device 1 to a state illustrated on the left side of FIG. 5 (a state in which the user faces the touch panel device 1). Therefore, the user is able to search pages by visually recognizing the touch panel display unit 20 and performing touch operations thereon with the touch panel display unit 20 directed to the front of the user.

When the condition of STEP 1 is satisfied, the processing proceeds to STEP 2, in which the fore edge image display unit 11 displays the fore edge image 60, which depicts the fore edge of a paper-based thick book and extends in the vertical direction (y direction), in the right edge portion of the touch panel display unit 20 as illustrated on the right side of FIG. 5.

Additionally, in the case of an electronic book set to opening to right, the fore edge image is displayed in the left edge portion of the touch panel display unit 20.

Figure 6:
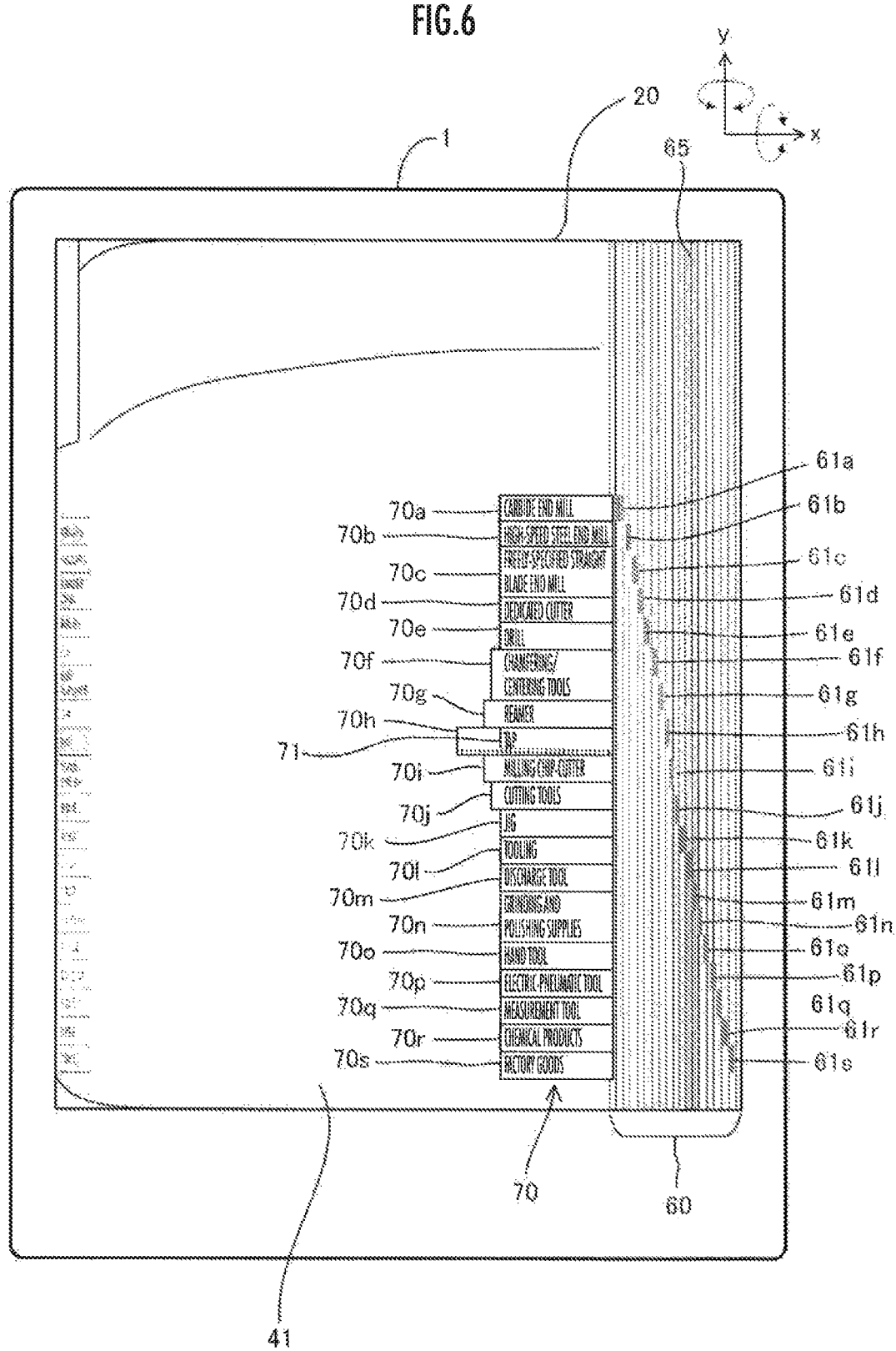
FIG. 6 is an explanatory diagram of a search screen on which a fore edge image, an edge index, and an item name image are displayed.

The subsequent STEP 4 is a process performed by the edge index display unit 12 (corresponding to an edge index displaying step in the electronic book browsing assistance method of the present invention). As illustrated in FIG. 6, the edge index display unit 12 displays 19 edge indices 61*a*, 61*b*, - - - , and 61*s*, in which the page ranges of the items (a carbide end mill, a high-speed steel end mill, - - - , factory goods) are colored into strips, in the fore edge image 60 in a vertically (in the y direction) shifted and superposed manner in such a way that the edge indices do not overlap each other.

Figure 4:
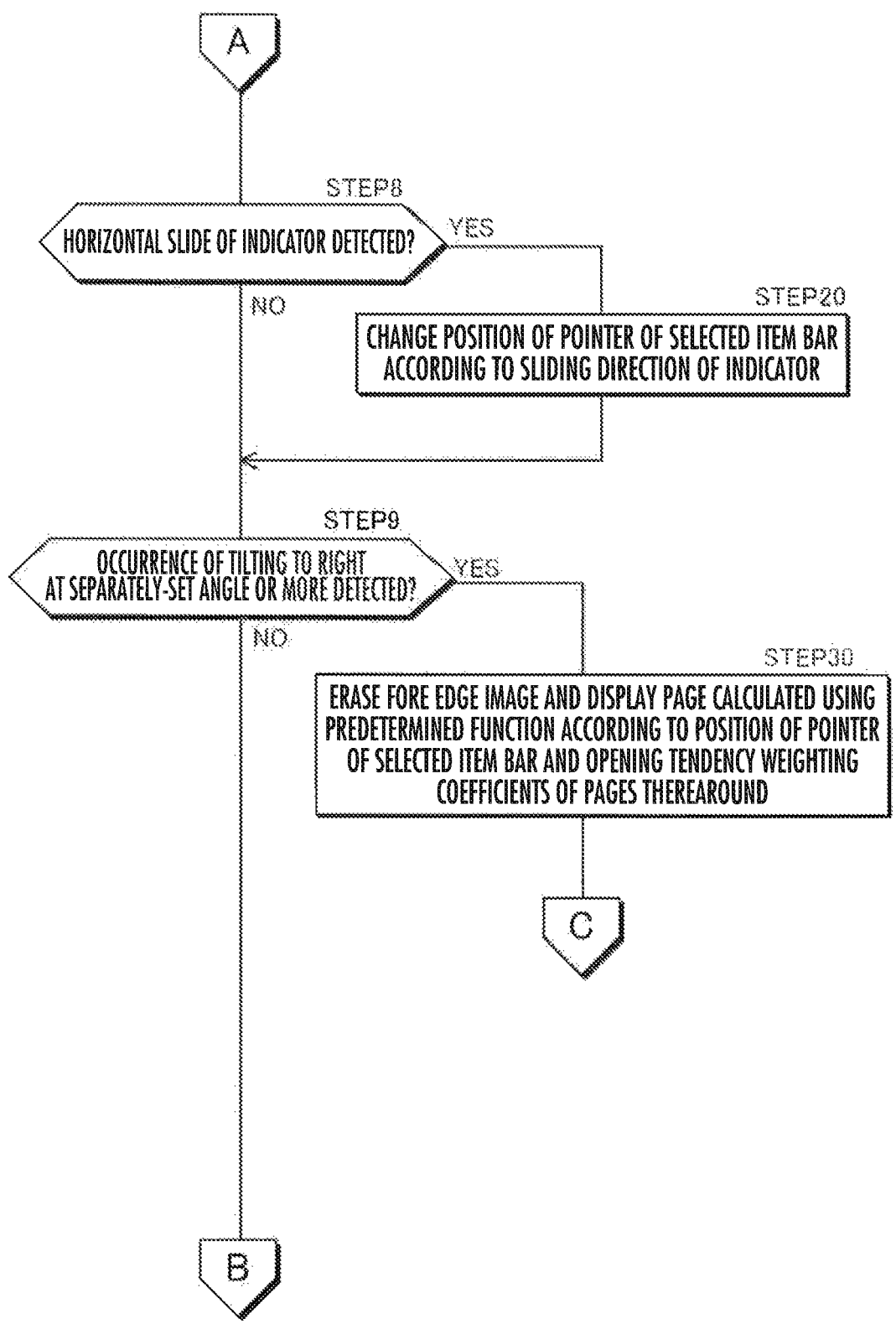
FIG. 4 is a second flowchart of processing for a touch operation and a tilt operation.

The subsequent STEP 5 to STEP 8 in FIG. 4, STEP 10, and STEP 20 are processes performed by the item name image display unit 13 (corresponding to an item name image displaying step in the electronic book browsing assistance method of the present invention). As illustrated in FIG. 6, the item name image display unit 13 displays the item name image 70 composed of 19 item bars 70*a*, 70*b*, - - - , and 70*s*.

The item name image display unit 13 performs enlarged display of an item bar displaying the name of an item assigned to the edge index with which the indicator is in contact in STEP 5. Furthermore, in the next STEP 6, the item name image display unit 13 displays vertical lines indicating the positions of the pages included in the item "tap" in the lower part of the item bar 70*h* subjected to the enlarged display.

Figure 8:
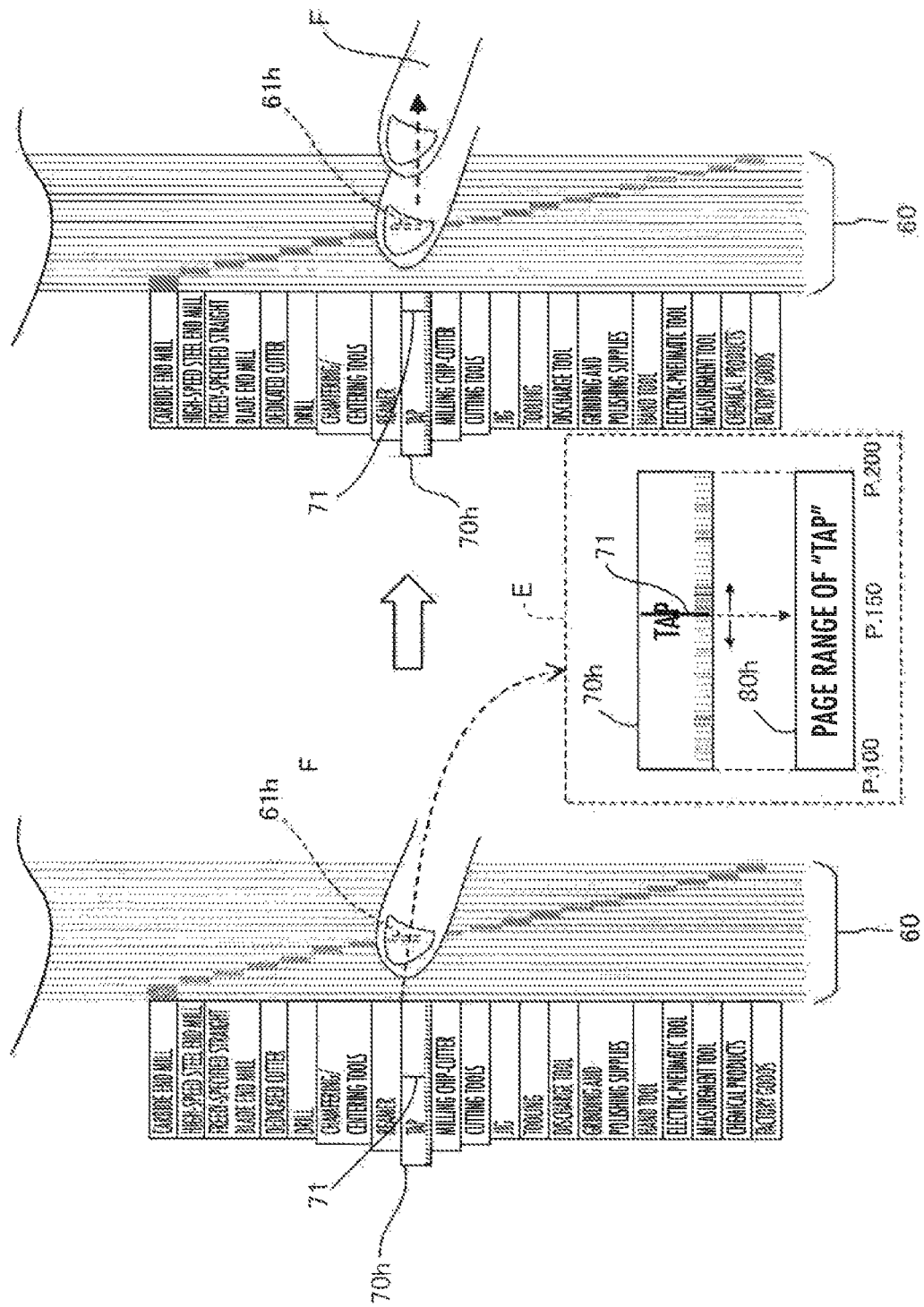
FIG. 8 is an explanatory diagram of a change in the item name image in the case of sliding a finger in the right direction on the fore edge image.

Incidentally, as illustrated in the enlarged display at E of FIG. 8, the width of the item bar 70*h* in the horizontal direction (x direction) indicates the range of the pages included in the item "tap" and the position of each vertical line displayed in the lower part of the item bar 70*h* indicates the arrangement order of each page in the item "tap." In the example of E, the item "tap" ranges from page 100 to page 200 (selected range) and a pointer 71 is located in the middle of the item bar 70*h* and therefore the example illustrates that the arrangement order of page 150 in the middle is selected.

Moreover, the item name image display unit 13 sets a darker color as the value of the opening tendency weighting coefficient of each vertical line increases according to the value of the opening tendency weighting coefficient of each vertical line, with respect to the shade of color of each vertical line (which corresponds to a change in the display mode of the vertical line of the present invention). Although a change in the display mode of the vertical line corresponding to each page has been performed by changing the shade of color in this embodiment, any display mode may be used as long as a user is able to identify differences in the browsing frequency of the respective pages, and the display mode may be changed with the color type, the luminance, the line width (thickness), or the like, in addition to the shade of color.

Incidentally, the opening tendency weighting coefficient is set to a greater value as the browsing frequency of each page increases with respect to each page. Moreover, the browsing frequency of each page is included in browsing data retained in the memory of the electronic catalog server 101 or of the control unit 10 by the browsing history management unit 15.

Therefore, the shade of the color of each vertical line displayed in the lower part of the item bar 70h changes according to the browsing frequency, and the user is able to easily find a page that the user often browses by visually recognizing the shades of the color of the vertical lines.

FIG. 6 illustrates a state in which a user's finger (indicator) is in contact with the edge index 61h assigned to the item "tap" (a state in which "tap" is selected), where the item bar 70h displaying the "tap" name is enlarged in comparison with other item bars in the display.

In the next STEP 7, the item name image display unit 13 branches to STEP 10 if the contact position detection circuit 21 detects that the indicator slides in the vertical direction of the fore edge image 60. Thereafter, when the edge index with which the indicator F is in contact is switched as illustrated in FIG. 7, the item name image display unit 13 changes the display mode of the item name image 70 in response thereto and then proceeds to STEP 8 of FIG. 4.

Figure 7:
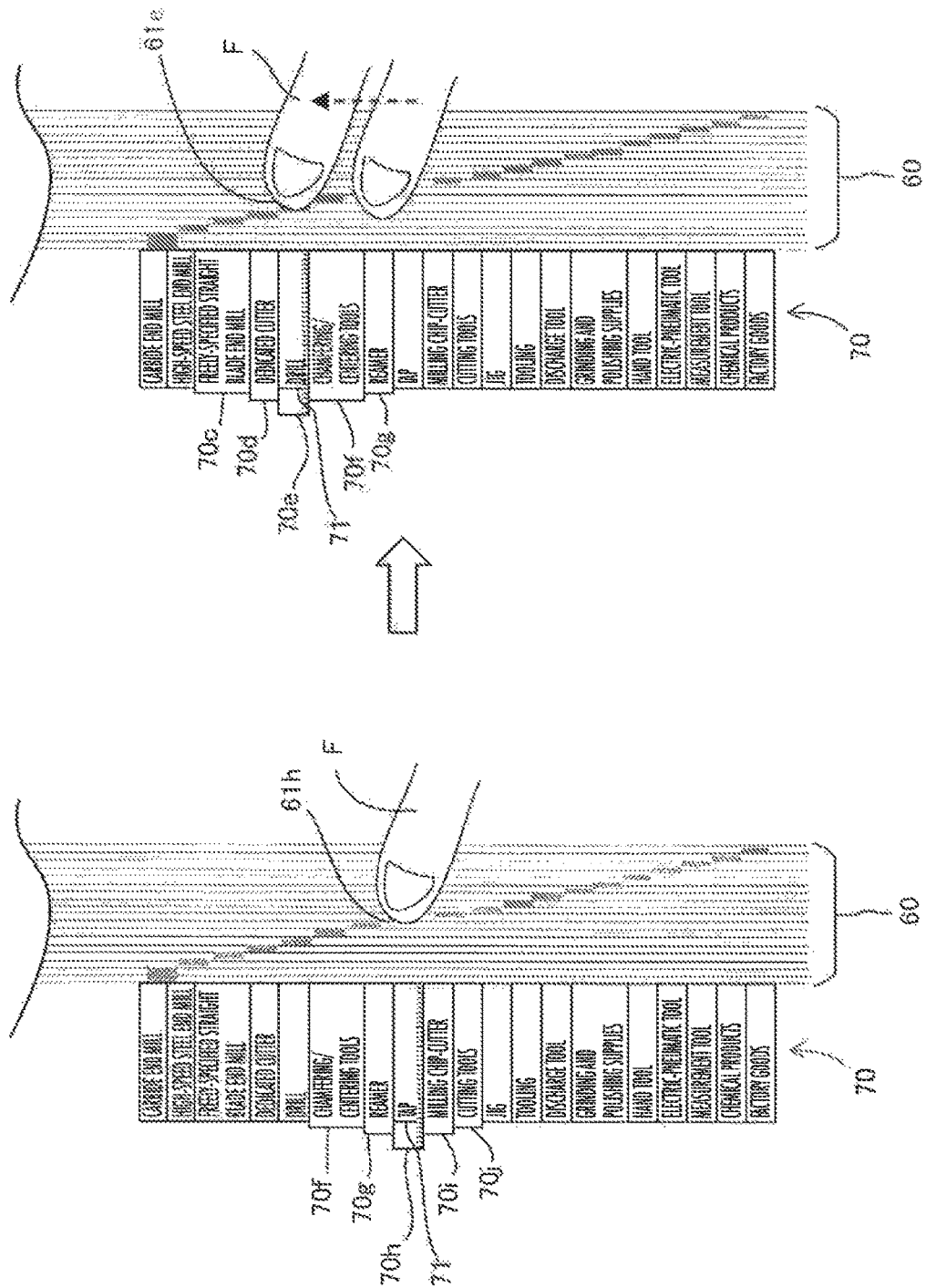
FIG. 7 is an explanatory diagram of a change in the item name image in the case of sliding a finger upward on the fore edge image.

For example, the left side of the white arrow in FIG. 7 illustrates a state in which the user's finger F (indicator) is in contact with the edge index 61h assigned to the item "tap," where the item name image display unit 13 displays the item bar 70h displaying the name of the item "tap" so as to be larger in size than other item bars and gradually decreases the sizes of the item bars 70g, 70f, 70i, and 70j around the item bar 70h, thereby enabling the user to easily recognize that the item "tap" is selected.

Moreover, the right side of the white arrow in FIG. 7 illustrates a case where the user's finger F slides upward (in the y direction) and then the state is switched to another state in which the user's finger F is in contact with the edge index 61e assigned to the item "drill." In this case, the item name image display unit 13 increases the size of an item bar 70e displaying the name of the item "drill" so as to be larger than other item bars and gradually decreases the sizes of the item bars 70d, 70c, 70f, and 70g around the item bar 70e, thereby enabling the user to easily recognize that the item "drill" is selected. The same applies to the case where the user's finger F slides downward.

In the next STEP 8 in FIG. 4, the item name image display unit 13 branches to STEP 20 when the contact position detection circuit 21 detects that the indicator slides in the horizontal direction of the fore edge image 60. Thereafter, the item name image display unit 13 changes the position of the pointer 71 in the item bar 70h according to the position in the horizontal direction where the indicator (the user's finger F) is in contact with the fore edge image 60 as illustrated in FIG. 8 and then proceeds to STEP 9.

The left side of the white arrow in FIG. 8 illustrates a case where the state is switched to another state in which the user's finger F is in contact with the edge index 61h assigned to the item "tap," where the item name image display unit 13 displays the pointer 71 in the central part in the horizontal direction (x direction) of the item bar 70h.

Furthermore, if the user performs an operation of sliding the finger F in the right direction as illustrated on the right side of the white arrow in FIG. 8, the item name image display unit 13 shifts the position of the pointer 71 to the right side in response to the operation.

Incidentally, the position of the pointer 71 in the item bar 70h corresponds to the arrangement position (arrangement order) of the page in the range 80h of the pages included in the item "tap" as described with reference to E. Therefore, the user is able to easily recognize the position of the selected page by visually recognizing the position of the pointer 71 of the item bar 70h.

Although the description has been made by giving an example of the edge index 61h and the item bar 70h assigned to the item "tap" with reference to FIG. 8, the item name image display unit 13 performs the same processing with respect to the edge index and the item bar assigned to any other item.

The subsequent STEP 9 and STEP 30 are processes performed by the selected page display unit 14 (corresponding to a selected page displaying step of the electronic book browsing assistance method of the present invention). The selected page display unit 14 branches to STEP 30 if the tilt sensor 22 detects a rightward tilt operation in which the touch panel device 1 is switched from the state on the left side of the white arrow illustrated in FIG. 9 (a state in which the user faces the touch panel device 1 in this specification) to a state on the right side in STEP 9 (if the tilt sensor 22 detects an occurrence of tilting to the right at a separately-set angle or more), or the selected page display unit 14 returns to STEP 7 in FIG. 3 unless the rightward tilt operation is detected.

Figure 3:
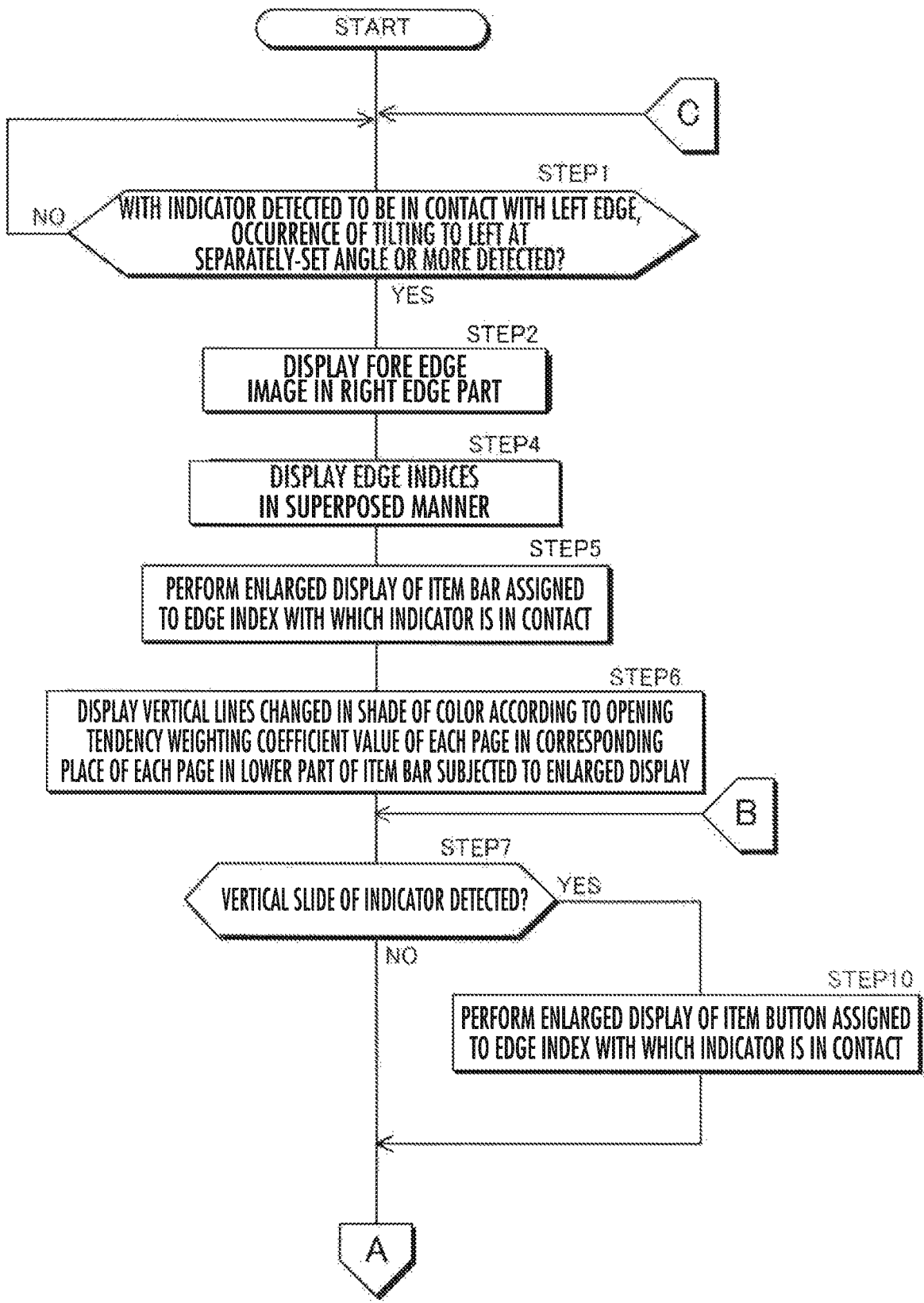
FIG. 3 is a first flowchart of processing for a touch operation and a tilt operation.

In STEP 30, the selected page display unit 14 erases the displays of the fore edge image 60 and the item name image 70 and displays the browse screen 40 displayed by selecting the page calculated using a predetermined function according to the position of the pointer in the item bar and the opening tendency weighting coefficients of the pages therearound in the touch panel display unit 20 as illustrated on the right side of the white arrow in FIG. 9, and then returns to STEP 1 of FIG. 3.

Through the processes of the flowcharts in FIGS. 3 and 4 described hereinabove, the user is able to easily identify and display a target page by displaying the search screen 41 including the fore edge image 60 and the item name image 70 by tilting the touch panel device 1 to the left, switching the item selected by sliding the finger in the vertical direction on the fore edge image 60, selecting the position of the page in the range of the pages of each item by sliding the finger in the horizontal direction, and tilting the touch panel device 1 to the right.

Subsequently, referring to FIG. 10, description will be made on the management of browsing data using a server (electronic catalog server) 101 and on coloring processing of the fore edge image 60 using the browsing data.

FIG. 10 illustrates a mode in which respective users (users A, B, C, - - - ) enter IDs (identifiers) and PWs (passwords) into the website of an electronic catalog through the communication network 100 by using their own touch panel devices 1a, 1b, 1c, - - - (hereinafter, also generally referred to as "touch panel device 1") to access the website and download data of the electronic catalog from the server 101 for browsing.

The identifier reception unit 16 (see FIG. 2) of each touch panel device 1 accesses the website of the electronic catalog to perform authentication processing when the user enters ID and PW and then downloads data of the electronic catalog from the server 101.

The browsing history management unit 15 of each touch panel device 1 uploads browsing data including information of the pages browsed by the user (page numbers, an item to which each page belongs, a browsing frequency of each page, browsing time of each page, and the like) to the server 101. In this case, the function of storing the browsing data in the server 101 corresponds to a browsing history storage unit of the present invention. In addition, the browsing data may be retained in the memory of the touch panel device 1.

As illustrated in FIG. 10, the server 101 retains browsing data 111, 112, 113, and subsequent ones of each user and retains browsing data of groups G1, G2, G3, and subsequent ones each including a plurality of users.

In FIG. 10, the group G1 made up of users A and B is illustrated. Data of the group G1 is the sum of data of the user A and data of the user B. For example, the browsing frequency of each page is the total of the browsing frequency of the user A and the browsing frequency of the user B.

The fore edge image display unit 11 determines whether to use the user's browsing data (individual browsing mode) or to use the browsing data of a group to which the user belongs (group browsing mode) according to a user's selection operation. Furthermore, the fore edge image display unit 11 recognizes the browsing frequency of each page of the electronic catalog from the browsing data and, as illustrated at 65 of FIG. 6, applies a different color for a page at which the browsing frequency is equal to or more than a predetermined number of times from the color of the pages at which the browsing frequency is less than the predetermined number of times. This enables the user to easily find the page frequently browsed by the user.

Although the item name image 70 displaying all of the item bars 70a, 70b, - - - , and 70s of the respective items is displayed as illustrated in FIG. 6 in this embodiment, only the item bar displaying the name of the selected item (the item assigned to the edge index with which the user's finger is in contact) may be displayed. In this case, the displayed item bar is switched every time the selected item is switched.

Moreover, although the electronic catalog of tools has been described as the electronic book of the present invention in this embodiment, the present invention is also applicable to a case of browsing various types of electronic books such as a magazine, a dictionary, a telephone directory, an instruction manual, and the like.

DESCRIPTION OF REFERENCE NUMERALS

1 Touch panel device
10 Control unit
11 Fore edge image display unit
12 Edge index display unit
13 Item name image display unit
14 Selected page display unit
15 Browsing history management unit
16 Identifier reception unit
20 Touch panel display unit
21 Contact position detection circuit
22 Tilt sensor
30 Communication circuit
40 Browse screen
41 Search screen
60 Fore edge image
61a to 61s Edge indices
70 Item name image
70a to 70s Item bars
71 Pointer
101 Electronic catalog server
111 User's browsing data
121 Group's browsing data
F User's finger (indicator)

The invention claimed is:

1. A method for assisting browsing of an electronic book by using a touch panel device, the touch panel device including a touch panel display unit, a contact position detection unit configured to detect a contact position of an indicator to the touch panel display unit, a tilt sensor configured to detect a tilt of the touch panel display unit, and a control unit configured to change the display of the touch panel display unit according to the contact position of the indicator detected by the contact position detection unit and the tilt of the touch panel display unit detected by the tilt sensor, the method comprising:

a fore edge image displaying step in which the control unit displays a fore edge image, which depicts a fore edge of a paper-based book and extends in a vertical direction of the touch panel display unit, in a right or left edge portion of the touch panel display unit with which the indicator is in contact when recognizing that an operation of tilting the touch panel device has been performed based on a detection situation of the tilt sensor simultaneously in a state where any one of pages of the electronic book is displayed in the touch panel display unit and where the contact position detection unit detects that the indicator is in contact with a right or left edge part of the touch panel display unit;

an edge index displaying step in which the control unit displays a plurality of edge indices, which are individually assigned to a plurality of items of the electronic book and each of which indicates a range of pages of each item, so as to be shifted in the vertical direction of the touch panel display unit and in a superposed manner on the fore edge image;

an item name image displaying step in which the control unit displays an item name image, which represents a name of the item assigned to the edge index with which the indicator is in contact among the plurality of edge indices, in the touch panel display unit; and a selected page displaying step in which the control unit selects and displays the page of the item, which is assigned to the edge index with which the indicator is in contact, in the touch panel display unit when recognizing that the operation of tilting the touch panel device has been performed based on a detection situation of the tilt sensor in a state where the fore edge image is displayed in the touch panel display unit and where the contact position detection unit detects that the indicator is in contact with any one of the edge indices.

2. A non-transitory computer readable recording medium storing an electronic book browsing assistance program performed by a control unit in a touch panel device including a touch panel display unit, a contact position detection unit configured to detect a contact position of an indicator to the touch panel display unit, a tilt sensor configured to detect a tilt of the touch panel display unit, and the control unit configured to change the display of the touch panel display unit according to the contact position of the indicator detected by the contact position detection unit and the tilt of the touch panel display unit detected by the tilt sensor, the program causing the control unit to function as:
- a fore edge image display unit which displays a fore edge image, which depicts a fore edge of a paper-based book and extends in a vertical direction of the touch panel display unit, in a right or left edge portion of the touch panel display unit with which the indicator is in contact when recognizing that an operation of tilting the touch panel display unit has been performed based on a detection situation of the tilt sensor simultaneously in a state where any one of pages of the electronic book is displayed in the touch panel display unit and where the contact position detection unit detects that the indicator is in contact with a right or left edge part of the touch panel display unit;
- an edge index display unit which displays a plurality of edge indices, which are individually assigned to a plurality of items of the electronic book and each of which indicates a range of pages of each item, so as to be shifted in the vertical direction of the touch panel display unit and in a superposed manner on the fore edge image;
- an item name image display unit which displays an item name image, which represents a name of the item assigned to the edge index with which the indicator is in contact among the plurality of edge indices, in the touch panel display unit; and
- a selected page display unit which selects and displays the page of the item, which is assigned to the edge index with which the indicator is in contact, in the touch panel display unit when recognizing that the operation of tilting the touch panel device has been performed based on a detection situation of the tilt sensor in a state where the fore edge image is displayed in the touch panel display unit and where the contact position detection unit detects that the indicator is in contact with any one of the edge indices.

3. The non-transitory computer readable recording medium according to claim 2, wherein:
- the item name image display unit displays an item bar with a pointer, which extends in a horizontal direction of the touch panel display unit and has a horizontal width indicating a selection range of pages, as the item name image and changes a position of the pointer in the item bar according to a slide of the indicator in the horizontal direction of the touch panel display unit when the contact position detection unit detects the slide; and
- the selected page display unit selects a page whose arrangement order corresponds to the position of the pointer in the item bar among the pages belonging to the item assigned to the edge index with which the indicator is in contact when selecting the page of the assigned item and displays the page in the touch panel display unit.

4. The non-transitory computer readable recording medium according to claim 3, further comprising a browsing history management unit configured to retain browsing data indicating a browsing history of a page of the electronic book browsed by a user in a browsing history storage unit,
- wherein the item name image display unit displays vertical lines whose display mode is changed according to a browsing frequency of each page in a place corresponding to the arrangement order of each page of the item bar with reference to the browsing history data.

5. The non-transitory computer readable recording medium according to claim 4, further comprising an identifier reception unit configured to receive input of identifiers individually assigned to a plurality of users in browsing the electronic book, wherein:
- the browsing history management unit retains the browsing history of the electronic book for each of the identifiers; and
- the fore edge image display unit determines whether or not the browsing frequency is equal to or greater than a predetermined number of times by switching between an individual browsing mode in which the determination is performed based on the browsing frequency for each identifier and a group browsing mode in which the determination is performed based on a total browsing frequency of a plurality of identifiers according to a predetermined selection operation.

6. The non-transitory computer readable recording medium according to claim 3, further comprising a browsing history management unit configured to retain browsing data indicating a browsing history of a page of the electronic book browsed by a user in a browsing history storage unit,
- wherein the fore edge image display unit displays the fore edge image in a display mode changed according to the browsing frequency of each page with reference to the browsing data when displaying the fore edge image.

* * * * *